United States Patent
Wei

(10) Patent No.: US 7,800,836 B1
(45) Date of Patent: Sep. 21, 2010

(54) ZOOM LENS

(75) Inventor: Lai Wei, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 0 days.

(21) Appl. No.: 12/721,020

(22) Filed: Mar. 10, 2010

(30) Foreign Application Priority Data

Mar. 26, 2009 (JP) .............................. 2009-077211

(51) Int. Cl.
G02B 15/14 (2006.01)
(52) U.S. Cl. ...................... 359/691; 359/680; 359/682; 359/683; 359/684; 359/685; 359/740; 359/793
(58) Field of Classification Search ................ 359/680, 359/682–685, 691, 740, 793
See application file for complete search history.

(56) References Cited

U.S. PATENT DOCUMENTS

| | | | |
|---|---|---|---|
| 6,191,896 B1* | 2/2001 | Itoh | 359/689 |
| 6,972,908 B2* | 12/2005 | Noda | 359/680 |
| 6,977,778 B2* | 12/2005 | Nose et al. | 359/680 |
| 7,042,652 B2* | 5/2006 | Nose et al. | 359/689 |
| 7,110,187 B2* | 9/2006 | Shirota | 359/689 |
| 7,215,482 B2* | 5/2007 | Matsusaka | 359/682 |
| 7,315,422 B2* | 1/2008 | Masui et al. | 359/680 |
| 7,339,747 B2* | 3/2008 | Yamamoto et al. | 359/686 |
| 7,576,924 B2* | 8/2009 | Katakura | 359/691 |
| 2005/0207023 A1* | 9/2005 | Suzuki | 359/680 |
| 2005/0231817 A1* | 10/2005 | Matsusaka et al. | 359/680 |
| 2009/0034090 A1* | 2/2009 | Eguchi | 359/684 |

FOREIGN PATENT DOCUMENTS

| | | |
|---|---|---|
| JP | 2003-287677 A | 10/2003 |
| JP | 2005-250171 | 9/2005 |
| JP | 2006-039094 | 2/2006 |

* cited by examiner

*Primary Examiner*—Evelyn A. Lester
(74) *Attorney, Agent, or Firm*—Foley & Lardner LLP

(57) ABSTRACT

A zoom lens includes, sequentially from an object side, a first lens group that is negative; and a second lens group that is positive, where focal length is varied by varying a distance between the first lens group and the second lens group. The first lens group includes, from the object side, a first lens that is a negative biconcave lens having at least one aspherical surface, and a second lens that is a positive meniscus lens having a convex surface facing toward the object side and at least one aspherical surface, and a first condition $0.8<|f_1/f_2|<1.0$ and a second condition $0.5<|r_2/f_1|<0.8$ are satisfied, where $f_1$ is the focal length of the first lens group, $f_2$ is the focal length of the second lens group, $r_2$ is radius of curvature of a surface of the first lens in the first lens group, the surface facing toward an image.

6 Claims, 6 Drawing Sheets

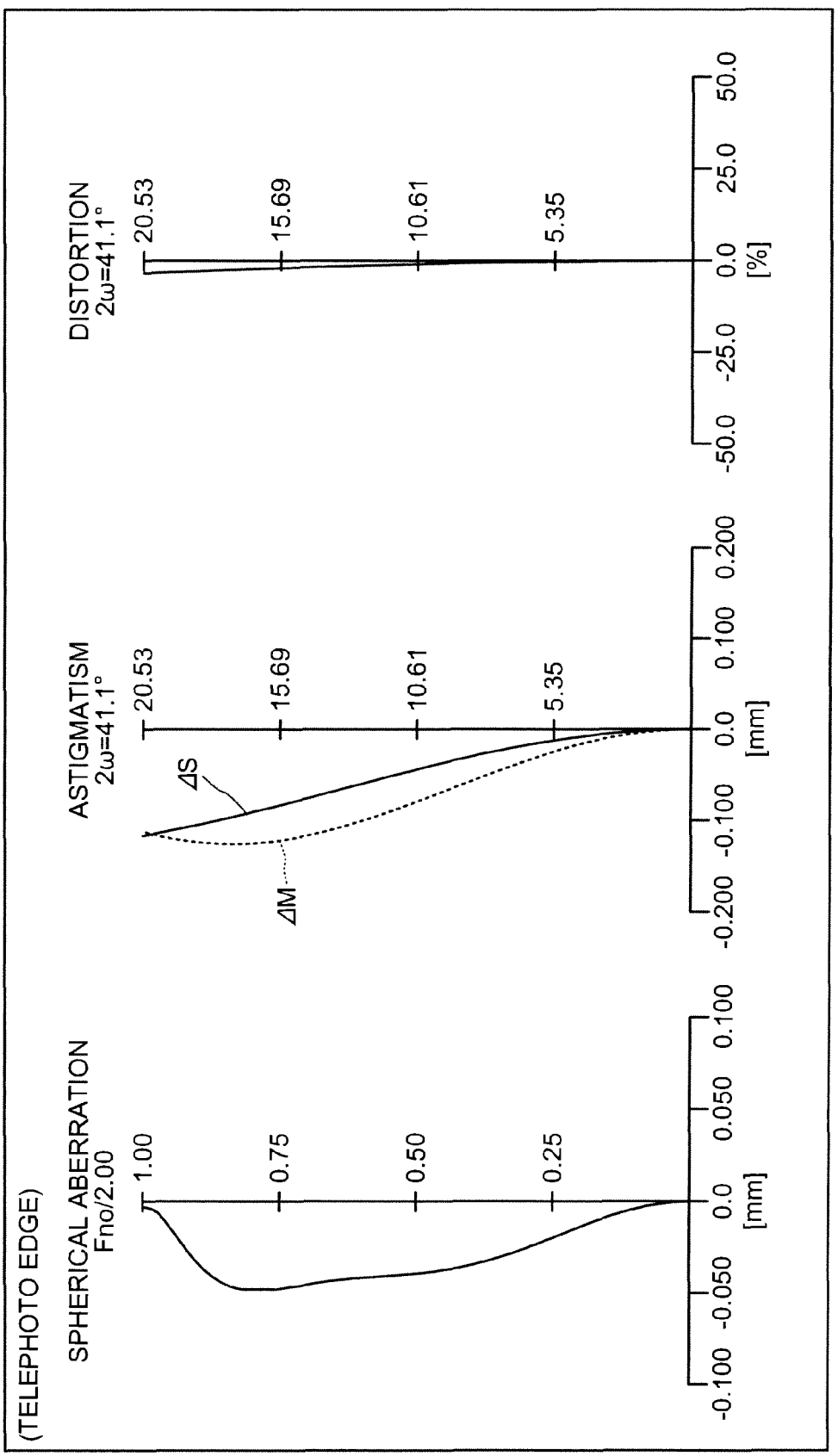

ZOOM LENS

CROSS-REFERENCE TO RELATED APPLICATIONS

This application is based upon and claims the benefit of priority from the prior Japanese Patent Application No. 2009-077211, filed on Mar. 26, 2009, the entire contents of which are incorporated herein by reference.

BACKGROUND OF THE INVENTION

1. Field of the Invention

The present invention relates to a zoom lens.

2. Description of the Related Art

In recent years, imaging apparatuses such as digital cameras (digital still cameras) and monitoring-use video cameras equipped with an imaging element, such as a charge-coupled device (CCD) and a complimentary metal-oxide semiconductor (CMOS), have come to be commonly known. Demands placed on these imaging apparatuses, in general, include high image quality and high resolution in a compact and light-weight package. Relatively low manufacturing cost is also desirable. Thus, imaging zoom lenses equipped on such imaging apparatuses are also demanded to be more compact and light-weight with a lower cost.

Consequently, to address such demands, numerous zoom lenses equipped with, sequentially from an object side, a negative first lens group and a positive second lens group, and capable of varying focal length by changing the interval between the first and the second lens groups have been proposed, such as those disclosed in Japanese Patent Application Laid-Open Publication Nos. 2006-39094, 2003-287677, and 2005-250171. Such two-lens-group zoom lenses are advantageous in that a relatively simple lens barrel structure can be configured easily.

The zoom lenses disclosed in the Japanese Patent Application Laid-Open Publications cited above, however, have many shortcomings, particularly as lenses to be equipped on imaging apparatuses of which compactness and high resolution are demanded.

For example, the zoom lenses recited in Japanese Patent Application Laid-Open Publication Nos. 2006-39094 and 2003-287677 are configured by 7 lens elements (3 lens elements in the first group, 4 lens elements in the second group) and thus, the structure is not simple nor is a sufficiently compact size achieved. Furthermore, a glass aspherical lens is employed arising in a further problem of high manufacturing cost.

The zoom lens recited in Japanese Patent Application Laid-Open Publication No. 2005-250171 makes copious use of aspherical lenses to facilitate compactness and high resolution, however, the F number at the wide angle edge is 3.5, dark, arising in a problem with the brightness of the lens.

SUMMARY OF THE INVENTION

It is an object of the present invention to at least solve the above problems in the conventional technologies.

A zoom lens according to one aspect of the present invention includes, sequentially from an object side, a first lens group that is negative; and a second lens group that is positive, where focal length is varied by varying a distance between the first lens group and the second lens group. The first lens group includes, from the object side, a first lens that is a negative biconcave lens having at least one aspherical surface, and a second lens that is a positive meniscus lens having a convex surface facing toward the object side and at least one aspherical surface, and a first condition $0.8<|f_1/f_2|<1.0$ and a second condition $0.5<|r_2/f_1|<0.8$ are satisfied, where $f_1$ is the focal length of the first lens group, $f_2$ is the focal length of the second lens group, $r_2$ is radius of curvature of a surface of the first lens in the first lens group, the surface facing toward an image.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is a diagram depicting spherical aberration, astigmatism, and distortion occurring at the telephoto edge of the zoom lens according to the second example.

DETAILED DESCRIPTION OF THE PREFERRED EMBODIMENTS

Figure 1:
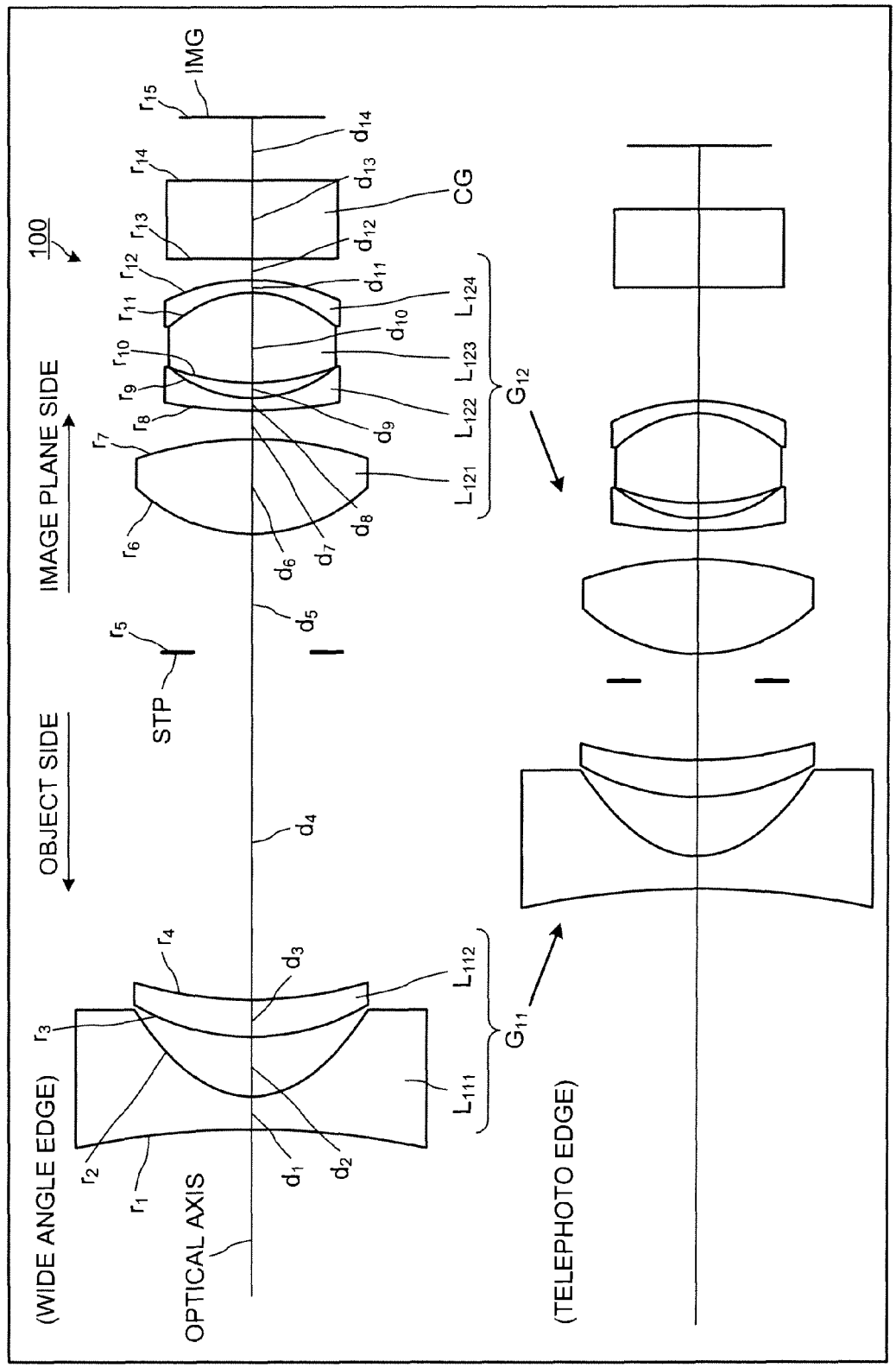
FIG. 1 is a cross sectional view, along an optical axis, of a zoom lens according to a first example.

Referring to the accompanying drawings, exemplary embodiments according to the present invention are explained in detail below.

A zoom lens according to an embodiment includes, from an object side, a negative first lens group and a positive second lens group. The zoom lens varies focal length by varying the distance between the first and the second lens groups. Further, correction of image plane (image position) variation accompanying magnification and focusing is performed by moving the first lens group along the optical axis.

The first lens group includes, sequentially from the object side, a first lens that is a negative biconcave lens and a second lens that is a positive meniscus lens having a convex surface facing toward the object side. The first lens and the second lens respectively have at least 1 aspherical surface, enabling excellent correction of spherical aberration, coma aberration, and astigmatism.

An object of the present invention is to provide a compact, wide angle view, large diameter zoom lens having high optical performance. To achieve this object, various conditions are established as indicated below.

To achieve compactness, a wide angle view, and a large diameter, a zoom lens according to an embodiment preferably satisfies the following conditional expression, where, $f_1$ is the focal length of the first lens group and $f_2$ is the focal length of the second lens group.

$$0.8<|f_1/f_2|<1.0 \qquad (1)$$

Conditional expression (1) is an expression to prescribe a ratio between the focal length $f_1$ of the first lens group and the focal length $f_2$ of the second lens group. By satisfying conditional expression (1), power distribution for the first and the second lens groups can be appropriately prescribed, thereby facilitating compactness, a wide angle view, and a large diameter for the zoom lens. Below the lower limit of conditional expression (1), convergence by the second lens group becomes too weak requiring increased movement of the second lens group for magnification, thus making compactness of the optical system difficult to achieve. On the other hand, beyond the upper limit of conditional expression (1), divergence by the first lens group becomes too weak making wide angle view difficult to achieve and further, convergence by the second lens group becomes strong resulting in excessive correction of spherical aberration, and therefore is not desirable.

Further, to maintain high optical performance, the zoom lens according to the embodiment preferably satisfies the following conditional expression, where $r_2$ is the radius of curvature of a surface of the first lens in the first lens group, the surface facing toward the image.

$$0.5 < |r_2/f_1| < 0.8 \quad (2)$$

Conditional expression (2) is an expression to prescribe, for the first lens, the shape of the surface facing toward the image. A curvature within a range satisfying conditional expression (2) causes the surface facing toward the image, to be concentric with respect to the entrance pupil location, whereby the occurrence of various types of aberrations can be controlled. Below the lower limit of conditional expression (2), the radius of curvature of the surface facing toward the image becomes small, making lens processing difficult and divergence excessively large, causing the Petzval sum to become excessively small. On the other hand, beyond the upper limit of conditional expression (2), although lens processing becomes easy, the surface facing toward the image does not become concentric with the entrance pupil location, making correction of distortion and field curvature difficult.

The second lens group of the zoom lens according to the embodiment includes, from the object side, a first lens that is a positive lens having at least 1 aspherical surface, a second lens that is a negative lens having at least 1 aspherical surface, a third lens that is a positive lens, and a fourth lens that is a negative lens. By cementing the third and the fourth lenses together, the occurrence of chromatic aberration can be controlled.

Preferably, the following conditional expression is satisfied, where $f_{21}$ is the focal length of the first lens in the second group, $f_{22}$ is the focal length of the second lens in the second lens group, and $f_w$ is the focal length at the wide angle edge of the zoom lens.

$$|(1/f_{21})+(1/f_{22})| \times f_w < 0.1 \quad (3)$$

Conditional expression (3) is an expression to prescribe power distribution for the first and the second lenses of the second lens group. Beyond the upper limit of condition expression (3), refraction by the first lens becomes too strong with respect to refraction by the second lens in the second lens group, making the occurrence of spherical aberration prominent. In particular, if the first and the second lenses are formed of resin, variations in spherical aberration caused by temperature variations become large. Further, tolerance for deviations from the image plane focal position is lost.

The zoom lens according to the embodiment preferably satisfies the following conditional expression, where $\upsilon d_{24}$ is the Abbe number with respect to d line of the fourth lens in the second lens group.

$$\upsilon d_{24} < 26 \quad (4)$$

By satisfying conditional expression (4), i.e., by forming the fourth lens of the second lens group using a low dispersion material satisfying conditional expression (4), chromatic aberration caused by the second lens group is controlled and correction of chromatic aberration can be improved. For example, by satisfying conditional expression (4), the degree of axial chromatic aberration and chromatic aberration of magnification caused by a positive lens included in the second lens group and the degree of axial chromatic aberration and chromatic aberration of magnification in an opposite direction caused by the fourth lens, which is a negative lens included in the second lens group, become equivalent, enabling correction of overall chromatic aberration caused by the second lens group. Beyond the upper limit of conditional expression (4), at the fourth lens of the second lens group, the required degree of chromatic aberration cannot be caused to occur and as a result, chromatic aberration caused by the second lens group cannot be corrected and therefore, is not desirable.

The first and the second lenses included in the first lens group of the zoom lens according to the embodiment may be formed of resin (e.g., plastic). As a result, the first lens group, which is the heaviest, can be made lighter. Load on the lens driving system is also reduced. As a result, a smaller driving system can be adopted, achieving a reduction in overall size for a lens apparatus adopting the smaller driving system. Further, resin is inexpensive and easy to process. Thus, by forming the aspherical lenses of resin, manufacturing cost can be reduced.

Additionally, the first and the second lenses of the second lens group of the zoom lens according to the embodiment may be formed of resin (e.g., plastic). As a result, the weight and the manufacturing cost of the second lens group can be reduced.

The zoom lens according to the embodiment has the characteristics described and thus, is a compact, wide angle view, large diameter zoom lens having high optical performance. The zoom lens is excellent for digital cameras performing magnification on an order of 3 times and monitoring-use video cameras. The zoom lens adopts a resin lens having a suitable aspherical surface and thus, with few lens elements, the zoom lens can effectively correct various types of aberrations and facilitate a compact, light-weight optical system as well as reductions in manufacturing cost.

FIG. 1 is a cross sectional view, along the optical axis, of a zoom lens according to a first example. A zoom lens 100 according to the first example includes, sequentially from a non-depicted object side, a negative first lens group $G_{11}$ and a positive second lens group $G_{12}$. A diaphragm STP is disposed between the first lens group $G_{11}$ and the second lens group $G_{12}$. A cover glass CG is disposed between the second lens group $G_{12}$ and an image plane IMG. At the image plane IMG, the photo receiving region of an imaging element, such as a CCD and a CMOS, is disposed.

The zoom lens 100 performs magnification from a wide angle edge to a telephoto edge by moving the second lens group $G_{12}$ along the optical axis toward the object side, and further performs image plane correction together with the magnification by moving the first lens group $G_{11}$ along the optical axis toward the image plane IMG. The zoom lens 100 focuses by moving the first lens group $G_{11}$ along the optical axis.

The first lens group $G_{11}$ includes, sequentially from the object side, a first lens $L_{111}$ that is a negative biconcave lens and a second lens $L_{112}$ that is a positive meniscus lens having a convex surface facing toward the object side. Both surfaces of the first lens $L_{111}$ and of the second lens $L_{112}$ are aspherical. The first lens $L_{111}$ and the second lens $L_{112}$ are preferably formed of resin (plastic).

The second lens group $G_{12}$ includes, sequentially from the object side, a positive first lens $L_{121}$, a negative second lens $L_{122}$, a positive third lens $L_{123}$, and a negative fourth lens $L_{124}$. Both surfaces of the first lens $L_{121}$ and of the second lens $L_{122}$ are aspherical. Further, the third lens $L_{123}$ and the fourth lens $L_{124}$ are cemented together. The first lens $L_{121}$ and the second lens $L_{122}$ are preferably formed of resin (plastic).

Values related to the zoom lens according to the first example are given below.

focal length=3.10 mm (wide angle edge: fw) to 8.70 mm (telephoto edge)

F number=1.25 (wide angle edge) to 2.10 (telephoto edge)
angle of view (2ω)=131.1° (wide angle edge) to 41.1°(telephoto edge)

(Values related to conditional expression (1))

focal length ($f_1$) of first lens group $G_{11}$=−8.619 mm focal length ($f_2$) of second lens group $G_{12}$=10.15 mm $|f_1/f_2|$=0.85

(Values related to conditional expression (2))

radius of curvature ($r_2$) of surface of first lens $L_{111}$ in first lens group $G_{11}$ (surface facing toward image)=5.3953 mm $|r_2/f_1|$=0.63

(Values related to conditional expression (3))

focal length ($f_{21}$) of first lens $L_{121}$ in second lens group $G_{12}$=9.23 mm focal length ($f_{22}$) of second lens $L_{122}$ in second lens group $G_{12}$=−12.744 mm $$|(1/f_{21})+(1/f_{22})|\times f_w=0.093$$

(Values related to conditional expression (4))

Abbe number ($\upsilon d_{24}$) with respect to d line of fourth lens $L_{124}$ in second lens group $G_{12}$=23.78

$r_1$=−14.1984 (aspherical surface)
  $d_1$=1.50 $nd_1$=1.53116 $\upsilon d_1$=56.04

$r_2$=5.3953 (aspherical surface)
  $d_2$=3.61

$r_3$=11.9897 (aspherical surface)
  $d_3$=1.60 $nd_2$=1.58250 $\upsilon d_2$=30.18

$r_4$=18.1986 (aspherical surface)
  $d_4$=13.51 (wide angle edge) to 1.95 (telephoto edge)

$r_5$=∞ (diaphragm)
  $d_5$=7.63 (wide angle edge) to 1.03 (telephoto edge)

$r_6$=6.9045 (aspherical surface)
  $d_6$=4.20 $nd_3$=1.53116 $\upsilon d_3$=56.04

$r_7$=−13.3407 (aspherical surface)
  $d_7$=1.64

$r_8$=23.5970 (aspherical surface)
  $d_8$=0.60 $nd_4$=1.58250 $\upsilon d_4$=30.18

$r_9$=5.5940 (aspherical surface)
  $d_9$=0.63

$r_{10}$=9.3720
  $d_{10}$=4.10 $nd_5$=1.48749 $\upsilon d_5$=70.44

$r_{11}$=−5.5000
  $d_{11}$=0.60 $nd_6$=1.84666 $\upsilon d_6$=23.78

$r_{12}$=−6.5860
  $d_{12}$=1.00 (wide angle edge) to 7.59 (telephoto edge)

$r_{13}$=∞
  $d_{13}$=3.50 $nd_7$=1.51633 $\upsilon d_7$=64.14

$r_{14}$=∞
  $d_{14}$=2.84

$r_{15}$=∞ (image plane)

Constant of the cone (K) and Aspherical surface coefficient (A, B, C, D)

(first plane)

K=−27.4836,

A=6.402455×10$^{-4}$, B=−1.771150×10$^{-5}$,

C=1.776753×10$^{-7}$, D=−6.096480×10$^{-10}$ (second plane)

K=−0.0814,

A=1.007381×10$^{-3}$, B=−8.568266×10$^{-6}$,

C=2.174088×10$^{-6}$, D=−8.937014×10$^{-8}$ (third plane)

K=−18.4611,

A=−3.991163×10$^{-4}$, B=3.267436×10$^{-6}$,

C=2.525131×10$^{-6}$, D=−5.290001×10$^{-8}$ (fourth plane)

K=−8.1504,

A=−1.441518×10$^{-3}$, B=4.359741×10$^{-5}$,

C=4.253065×10$^{-7}$, D=−2.2924797×10$^{-9}$ (sixth plane)

K=−0.7841,

A=−1.429516×10$^{-4}$, B=8.535855×10$^{-6}$,

C=−6.949870×10$^{-9}$, D=−7.641869×10$^{-9}$ (seventh plane)

K=−0.4837,

A=5.626516×10$^{-4}$, B=1.269928×10$^{-7}$,

C=−6.386517×10$^{-7}$, D=7.899794×10$^{-9}$ (eight plane)

K=4.9500,

A=1.553465×10$^{-4}$, B=−2.365433×10$^{-5}$,

C=−2.102656×10$^{-6}$, D=1.100650×10$^{-7}$ (ninth plane)

K=−0.1378,

A=−8.961344×10$^{-5}$, B=−7.467724×10$^{-6}$,

C=−3.803919×10$^{-6}$, D=2.124074×10$^{-7}$

Figure 2:
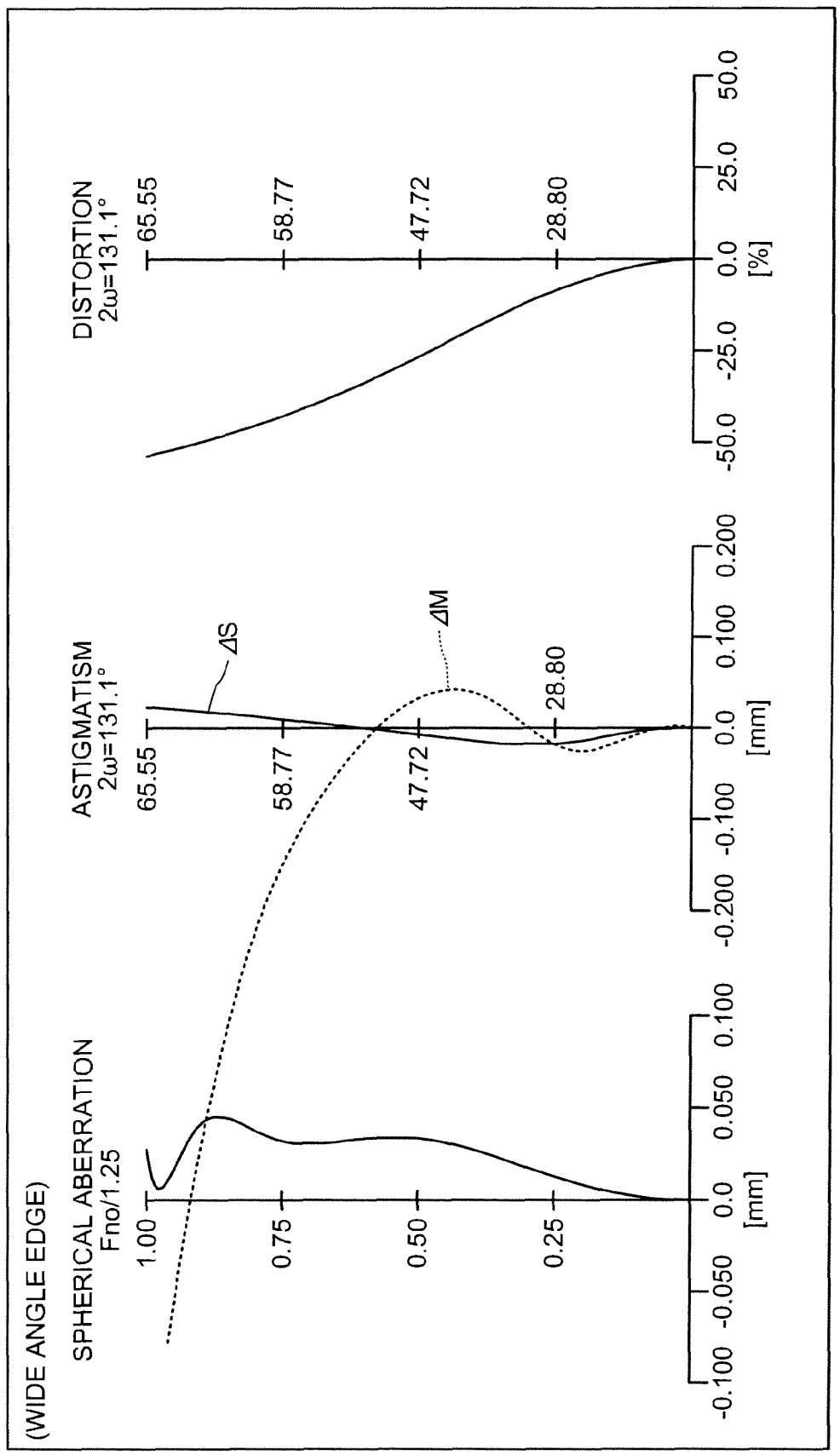
FIG. 2 is a diagram depicting spherical aberration, astigmatism, and distortion occurring at the wide angle edge of the zoom lens according to the first example.
Figure 3:
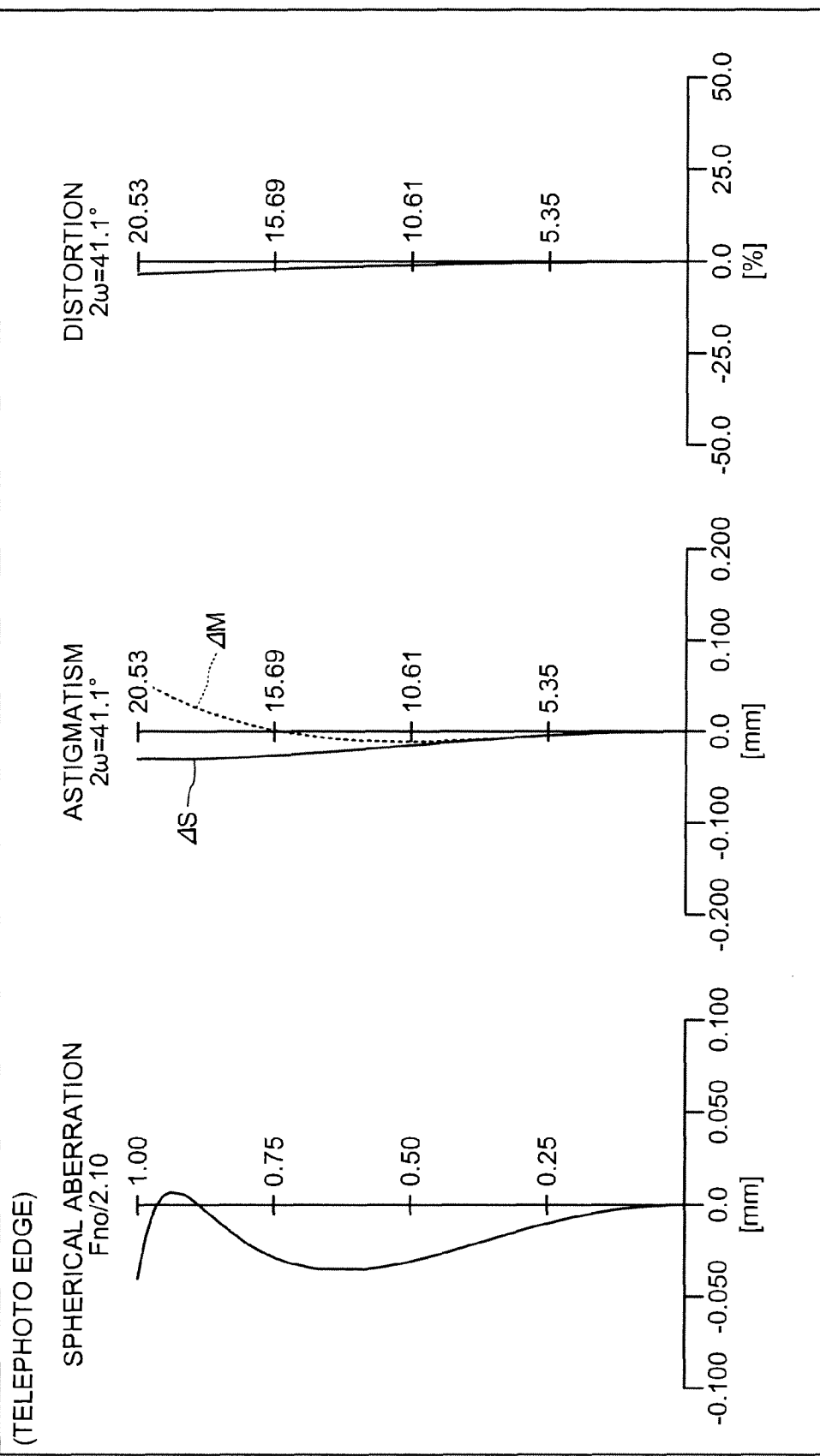
FIG. 3 is a diagram depicting spherical aberration, astigmatism, and distortion occurring at the telephoto edge of the zoom lens according to the first example.

FIG. 2 is a diagram depicting spherical aberration, astigmatism, and distortion occurring at the wide angle edge of the zoom lens according to the first example. FIG. 3 is a diagram depicting spherical aberration, astigmatism, and distortion occurring at the telephoto edge of the zoom lens according to the first example. Each of the diagrams depicts aberrations for a wavelength corresponding to the d line (λ=587.56 nm). In the diagrams, Fno indicates the F number and 2ω indicates the angle of view. Reference characters ΔS and ΔM in the astigmatism graph indicate aberration with respect to the sagittal image plane and the meridional plane, respectively.

Figure 4:
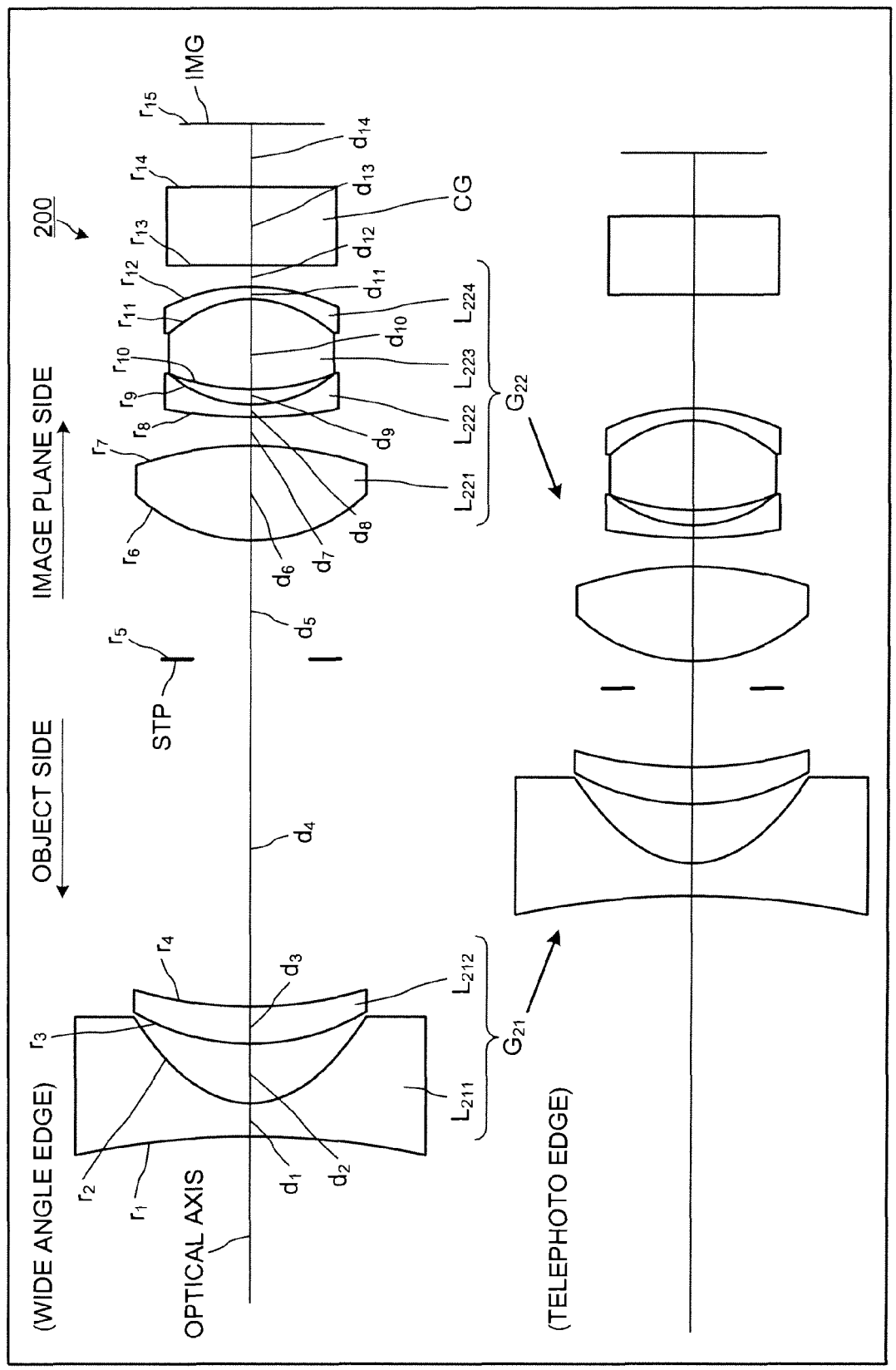
FIG. 4 is a cross sectional view, along the optical axis, of a zoom lens according to a second example.

FIG. 4 is a cross sectional view, along the optical axis, of a zoom lens according to a second example. A zoom lens 200 according to the second example includes, sequentially from a non-depicted object side, a negative first lens group $G_{21}$ and a positive second lens group $G_{22}$. A diaphragm STP is disposed between the first lens group $G_{21}$ and the second lens group $G_{22}$. A cover glass CG is disposed between the second lens group $G_{22}$ and an image plane IMG. At the image plane IMG, the photo receiving region of an imaging element, such as a CCD and a CMOS, is disposed.

The zoom lens 200 performs magnification from a wide angle edge to a telephoto edge by moving the second lens group $G_{22}$ along the optical axis toward the object side, and further performs image plane correction together with the magnification by moving the first lens group $G_{21}$ along the optical axis toward the image plane IMG. The zoom lens 200 focuses by moving the first lens group $G_{21}$ along the optical axis.

The first lens group $G_{21}$ includes, sequentially from the object side, a first lens $L_{211}$ that is a negative biconcave lens and a second lens $L_{212}$ that is a positive meniscus lens having a convex surface facing toward the object side. Both surfaces of the first lens $L_{211}$ and of the second lens $L_{212}$ are aspherical. The first lens $L_{211}$ and the second lens $L_{212}$ are preferably formed of resin (plastic).

The second lens group $G_{22}$ includes, sequentially from the object side, a positive first lens $L_{221}$, a negative second lens $L_{222}$, a positive third lens $L_{223}$, and a negative fourth lens $L_{224}$. Both surfaces of the first lens $L_{221}$ and of the second lens $L_{222}$ are aspherical. Further, the third lens $L_{223}$ and the fourth lens $L_{224}$ are cemented together. The first lens $L_{221}$ and the second lens $L_{222}$ are preferably formed of resin (plastic).

Values related to the zoom lens according to the second example are given below.

focal length=3.12 mm (wide angle edge: $f_w$) to 8.65 mm (telephoto edge)

F number=1.25 (wide angle edge) to 2.00 (telephoto edge)
angle of view (2ω)=125.7° (wide angle edge) to 41.1° (telephoto edge)

(Values related to condition expression (1))

focal length ($f_1$) of first lens group $G_{21}$=−9.267 mm focal length ($f_2$) of second lens group $G_{22}$=9.755 mm |$f_1$/$f_2$|=0.95

(Values related to conditional expression (2))

radius of curvature ($r_2$) of surface of first lens $L_{211}$ in first lens group $G_{21}$ (surface facing toward image)=6.6429 mm |$r_2$/$f_1$|=0.72

(Values related to conditional expression (3))

focal length ($f_{21}$) of first lens $L_{221}$ in second lens group $G_{22}$=8.886 mm focal length ($f_{22}$) of second lens $L_{222}$ in second lens group $G_{22}$=−12.105 mm

|(1/$f_{21}$)+(1/$f_{22}$)|×$f_w$=0.093

(Values related to conditional expression (4))

Abbe number (υ$d_{24}$) with respect to d line of fourth lens $L_{224}$ in second lens group $G_{22}$=20.88

$r_1$=−10.6000 (aspherical surface)
　　$d_1$=1.50 $nd_1$=1.53116 υ$d_1$=56.04

$r_2$=6.6429 (aspherical surface)
　　$d_2$=3.29

$r_3$=9.1454 (aspherical surface)
　　$d_3$=1.82 $nd_2$=1.58250 υ$d_2$=30.18

$r_4$=12.9941 (aspherical surface)
　　$d_4$=15.35 (wide angle edge) to 2.64 (telephoto edge)

$r_5$=∞ (diaphragm)
　　$d_5$=6.85 (wide angle edge) to 1.03 (telephoto edge)

$r_6$=6.1678 (aspherical surface)
　　$d_6$=4.30 $nd_3$=1.53116 υ$d_3$=56.04

$r_7$=−15.2435 (aspherical surface)
　　$d_7$=1.28

$r_8$=25.1943 (aspherical surface)
　　$d_8$=0.60 $nd_4$=1.58250 υ$d_4$=30.18

$r_9$=5.4609 (aspherical surface)
　　$d_9$=0.53

$r_{10}$=8.2379
　　$d_{10}$=4.10 $nd_5$=1.51680 υ$d_5$=64.17

$r_{11}$=−5.6180
　　$d_{11}$=0.60 $nd_6$=1.92286 υ$d_6$=20.88

$r_{12}$=−10.0187
　　$d_{12}$=1.00 (wide angle edge) to 6.82 (telephoto edge)

$r_{13}$=∞
　　$d_{13}$=3.50 $nd_7$=1.51633 υ$d_7$=64.14

$r_{14}$=∞
　　$d_{14}$=2.28

$r_{15}$=∞ (image plane)

Constant of the cone (K) and Aspherical surface coefficient (A, B, C, D)

(first plane)
　K=−18.7475,
　A=6.417394×10$^{-4}$, B=−1.317458×10$^{-5}$,
　C=1.035791×10$^{-7}$, D=−3.043491×10$^{-10}$ (second plane)
　K=0.099,
　A=1.103327×10$^{-3}$, B=−9.418918×10$^{-6}$,
　C=2.479598×10$^{-6}$, D=−7.309138×10$^{-8}$ (third plane)
　K=−9.4735,
　A=−3.968344×10$^{-4}$, B=−5.177537×10$^{-6}$,
　C=2.018317×10$^{-6}$, D=−3.796599×10$^{-8}$ (fourth plane)

K=−3.4965,

A=−1.401614×10⁻³, B=3.230460×10⁻⁵,

C=3.502216×10⁻⁷, D=−1.624054×10⁻⁸

(sixth plane)

K=−0.6782,

A=−7.069095×10⁻⁵, B=7.995099×10⁻⁶,

C=9.273456×10⁻⁹, D=−5.715277×10⁻⁹

(seventh plane)

K=−2.0558,

A=6.293389×10⁻⁴, B=−1.883781×10⁻⁶,

C=−7.046372×10⁻⁷, D=1.226877×10⁻⁸

(eighth plane)

K=4.0486,

A=1.471180×10⁻⁴, B=−2.529330×10⁻⁵,

C=−1.998147×10⁻⁶, D=1.009834×10⁻⁷

(ninth plane)

K=−0.0915,

A=−1.081264×10⁻⁴, B=1.219157×10⁻⁵,

C=−5.054048×10⁻⁶, D=3.105438×10⁻⁷

Figure 5:
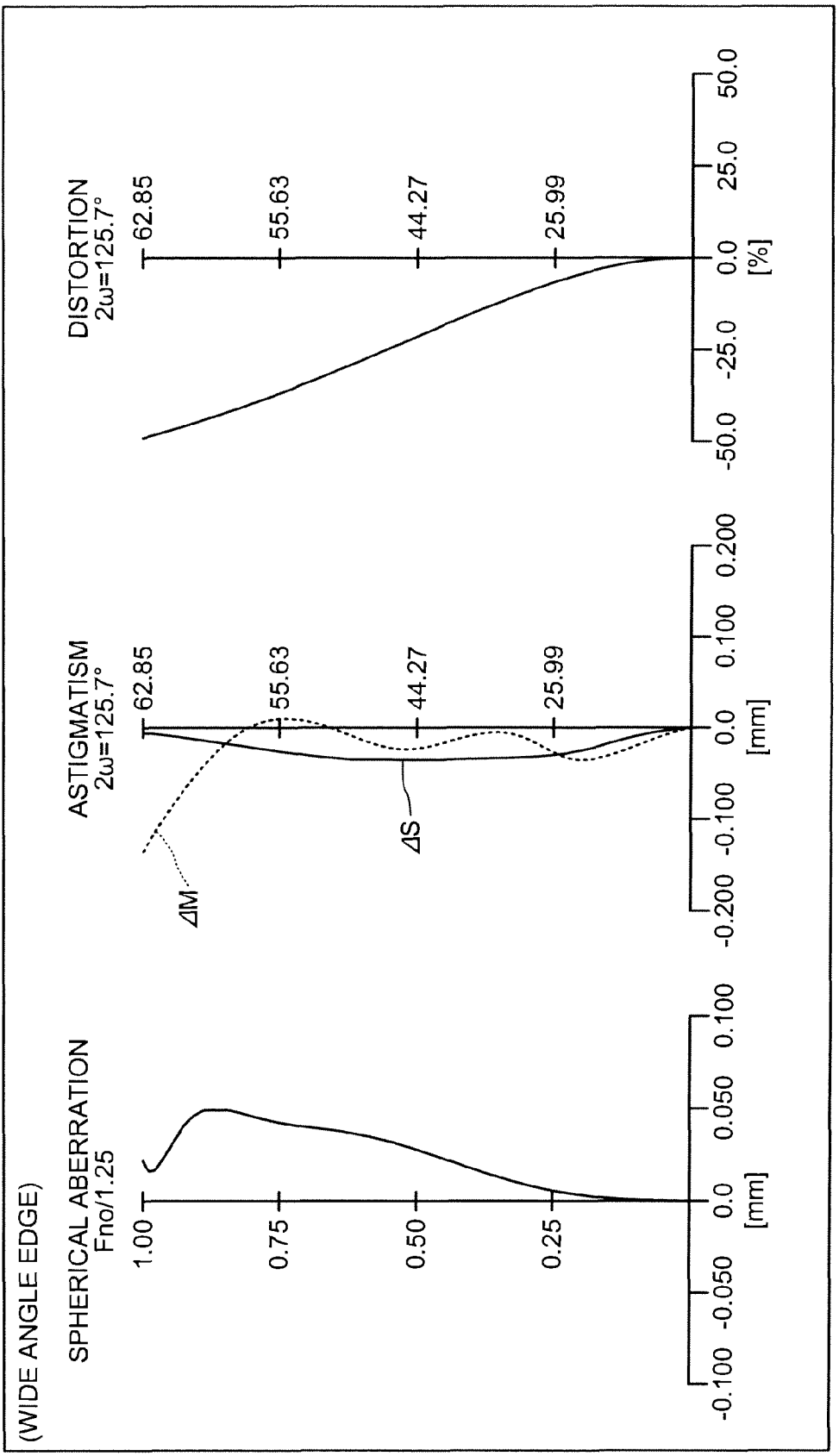
FIG. 5 is a diagram depicting spherical aberration, astigmatism, and distortion occurring at the wide angle edge of the zoom lens according to the second example.

FIG. 5 is a diagram depicting spherical aberration, astigmatism, and distortion occurring at the wide angle edge of the zoom lens according to the second example. FIG. 6 is a diagram depicting spherical aberration, astigmatism, and distortion occurring at the telephoto edge of the zoom lens according to the second example. Each of the diagrams depicts aberrations for a wavelength corresponding to the d line ($\lambda$=587.56 nm). In the diagrams, Fno indicates the F number and $2\omega$ indicates the angle of view. Reference characters $\Delta S$ and $\Delta M$ in the astigmatism graph indicate aberration with respect to the sagittal image plane and the meridional plane, respectively.

In the numerical data for each of the examples above, $r_1$, $r_2$, . . . indicate radii of curvature for each lens, diaphragm surface, etc; $d_1$, $d_2$, . . . indicate the thickness of or the distance between surfaces of the lenses, diaphragm, etc.; $nd_1$, $nd_2$, . . . indicates the refraction index with respect to the d line ($\lambda$=587.56 nm) of each lens; $\upsilon d_1$, $\upsilon d_2$, . . . indicates the Abbe number with respect to the d line ($\lambda$=587.56 nm) of each lens.

Each of the above aspherical surfaces can be expressed by equation [1], where with respect to the vertex as a point of reference, y is the height perpendicular to the optical axis and Z(y) is the change in y along the direction of optical axis.

$$Z(y) = \frac{y^2}{R\left(1 + \sqrt{1-(1+K)y/R^2}\right)^2} + Ay^4 + By^6 + Cy^8 + Dy^{10} \quad [1]$$

R is paraxial radii of curvature; K is constant of the cone; A, B, C, and D are the fourth, sixth, eighth, and tenth aspherical coefficients, respectively.

The zoom lens according to the examples has the characteristics described and thus, is a compact, wide angle view, large diameter, bright zoom lens having high optical performance, i.e., the wide angle edge of the angle of view is 120° or greater, the F number is approximately 1.2. Further, since various types of aberrations can be corrected well, the zoom lens is excellent for digital cameras performing magnification on an order of 3 times and monitoring-use video cameras. The zoom lens adopts a resin lens having a suitable aspherical surface and thus, with few lens elements, the zoom lens can effectively correct various types of aberrations and facilitate a compact, light-weight optical system as well as reductions in manufacturing cost.

According to the zoom lens of the present invention, spherical aberration can be corrected effectively. In particular, if the first and the second lenses of the second lens group are formed of resin, spherical aberration occurring as a result of temperature variations can be controlled.

According to the zoom lens of the present invention, chromatic aberration occurring at the second lens group can be corrected well.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A zoom lens comprising, sequentially from an object side:
    a first lens group that is negative; and
    a second lens group that is positive, wherein
    focal length is varied by varying a distance between the first lens group and the second lens group,
    the first lens group includes, from the object side, a first lens that is a negative biconcave lens having at least one aspherical surface, and a second lens that is a positive meniscus lens having a convex surface facing toward the object side and at least one aspherical surface, and
    a first condition $0.8 < |f_1/f_2| < 1.0$ and a second condition $0.5 < |r_2/f_1| < 0.8$ are satisfied, $f_1$ being a focal length of the first lens group, $f_2$ being a focal length of the second lens group, $r_2$ being radius of curvature of a surface of the first lens in the first lens group, the surface facing toward an image.

2. The zoom lens according to claim 1, wherein
    the second lens group includes, sequentially from the object side, a first lens that is positive and has at least one aspherical surface, a second lens that is negative and has at least one aspherical surface, a third lens that is positive, and a fourth lens that is negative,
    the third lens and the fourth lens are cemented to each other, and
    a third condition $|(1/f_{21})+(1/f_{22})| \times f_w < 0.1$ is satisfied, $f_{21}$ being a focal length of the first lens in the second lens group, $f_{22}$ being a focal length of the second lens in the second lens group, $f_w$ being a focal length occurring at a wide angle edge of the zoom lens.

3. The zoom lens according to claim 2, wherein
    a fourth condition $\upsilon d_{24} < 26$ is satisfied, $\upsilon d_{24}$ being an Abbe number with respect to a d line of the fourth lens in the second lens group.

4. The zoom lens according to claim 2, wherein
    the first lens and the second lens of the second lens group are formed of resin.

5. The zoom lens according to claim 1, wherein
    the first lens and the second lens of the first lens group are formed of resin.

6. The zoom lens according to claim 5, wherein
    the first lens and the second lens of the second lens group are made of resin.

* * * * *